US010860037B2

(12) United States Patent
Worsham, II et al.

(10) Patent No.: US 10,860,037 B2
(45) Date of Patent: Dec. 8, 2020

(54) SYSTEM AND METHOD FOR AUTOMATED DESCEND-TO-HOVER FLIGHT MODE

(71) Applicant: Textron Innovations Inc., Providence, RI (US)

(72) Inventors: Robert Earl Worsham, II, Weatherford, TX (US); Luke Dafydd Gillett, Grapevine, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 290 days.

(21) Appl. No.: 15/991,369

(22) Filed: May 29, 2018

(65) Prior Publication Data
US 2019/0369645 A1 Dec. 5, 2019

(51) Int. Cl.
*G05D 1/06* (2006.01)
*B64C 13/50* (2006.01)
(Continued)

(52) U.S. Cl.
CPC ......... *G05D 1/0676* (2013.01); *B64C 13/503* (2013.01); *B64C 27/04* (2013.01); *B64D 45/04* (2013.01)

(58) Field of Classification Search
CPC ...... G05D 1/00; G05D 1/0011; G05D 1/0088; G05D 1/02; G05D 1/0202; G05D 1/04; G05D 1/0607; G05D 1/042; G05D 1/06; G05D 1/08; G05D 1/0808; G05D 1/101; G05D 3/00; G05D 2201/0214; G05D 1/0676; B64D 45/04; B64C 27/04; B64C 27/06; B64C 27/54; B64C 27/56; B64C 27/57; B64C 27/58; B64C 27/605;
(Continued)

(56) References Cited

U.S. PATENT DOCUMENTS

2011/0270470 A1* 11/2011 Svoboda ............... G08G 5/003
701/3
2012/0158280 A1* 6/2012 Ravenscroft .......... G05D 1/106
701/400
(Continued)

FOREIGN PATENT DOCUMENTS

WO 2013105094 A1 7/2013

OTHER PUBLICATIONS

"Inspire 1 User Manual V2.2," Dji, XP055507777, retrieved from the internet on Jan. 28, 2019 at URL:https://dl.djicdn.com/downloads/INSPIRE +1+series/20171221/INSPIRE_1_V2.0_User_Manual_EN.pdf, Dec. 21, 2017, 64 pages.
(Continued)

*Primary Examiner* — Anthony R Jimenez
(74) *Attorney, Agent, or Firm* — Slater Matsin, LLP

(57) ABSTRACT

A method for controlling a rotorcraft, including receiving, by a fly-by-wire (FBW) system of the rotorcraft, a pilot input that initiates an automated descend-to-hover flight mode, scheduling, by the FBW system, a descend plane for bringing the rotorcraft to a hover, and autonomously descending and decelerating the rotorcraft according to the descend plane in response to determining that the rotorcraft has entered the automated descend-to-hover flight mode and until the rotorcraft reaches a hover or the rotorcraft exits the automated descend-to-hover flight mode.

20 Claims, 13 Drawing Sheets

(51) Int. Cl.
*B64C 27/04* (2006.01)
*B64D 45/04* (2006.01)

(58) Field of Classification Search
CPC ..... B64C 27/72; B64C 29/00; B64C 29/0008;
B64C 29/0016; B64C 2201/14; B64C
2201/141; B64C 2201/18; B64C 13/00;
B64C 13/02; B64C 13/04; B64C 13/042;
B64C 13/16; B64C 13/18; B64C 13/12;
B64C 13/30; B64C 13/503; B64C 13/50
USPC .......................................................... 701/16
See application file for complete search history.

(56) References Cited

U.S. PATENT DOCUMENTS

| | | | |
|---|---|---|---|
| 2015/0232181 A1* | 8/2015 | Oakley | B64C 39/024 |
| | | | 701/2 |
| 2018/0218621 A1 | 8/2018 | Canale | |

OTHER PUBLICATIONS

"Drone Doctor: RTH Return to home tested on DJI Phantom3 vs Inspire1 RTH," YouTube, XPo54978699, retrieved from the Internet on Apr. 11, 2019 at URL:https://www.youtube.com/watch?v=TAAt3vfhrqg, May 28, 2015, 51 pages.

\* cited by examiner

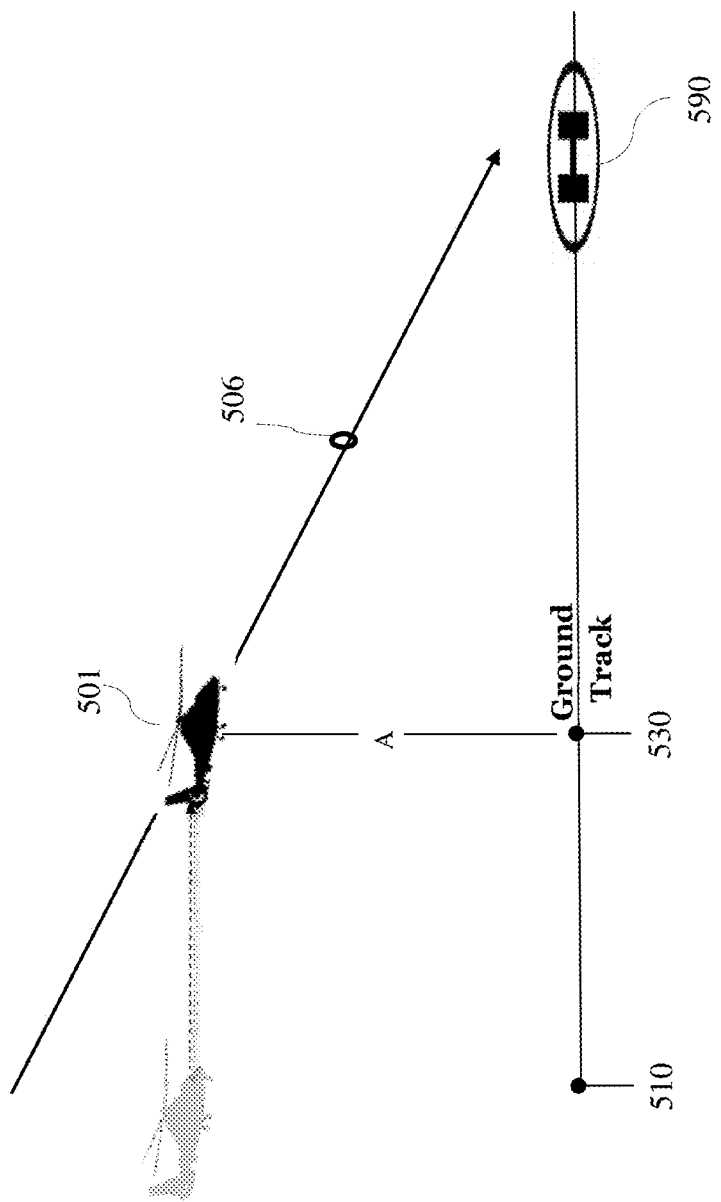

SYSTEM AND METHOD FOR AUTOMATED DESCEND-TO-HOVER FLIGHT MODE

TECHNICAL FIELD

The present invention relates generally to a system and method for automated flight control in a rotorcraft, and, in particular embodiments, to systems and methods for an automated descend-to-hover flight mode.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

Technical advantages are generally achieved, by embodiments of this disclosure which describe systems and methods for an automated descend-to-hover flight mode.

An embodiment method for controlling a rotorcraft includes receiving, by a fly-by-wire (FBW) system of the rotorcraft, a pilot input that initiates an automated descend-to-hover flight mode, scheduling, by the FBW system, a descend plane for bringing the rotorcraft to a hover, and autonomously descending and decelerating the rotorcraft according to the descend plane in response to determining that the rotorcraft has entered the automated descend-to-hover flight mode and until the rotorcraft reaches a hover or the rotorcraft exits the automated descend-to-hover flight mode.

An embodiment rotorcraft includes a main rotor system, and a fly-by-wire (FBW) system electrically connected to actuators linked to the main rotor system. The FBW system is operable to receive an input that identifies, for an automated descend-to-hover flight mode, determine a descend plane according to the initial aircraft location, wherein the descend plane includes an altitude profile that specifies target altitudes along a ground track, and control, in response to the rotorcraft entering an automated descend-to-hover mode, the main rotor system to cause the rotorcraft to autonomously decelerate and to descend according to the altitude profile of the descend plane until the rotorcraft reaches a hover.

An embodiment device includes a processor, and a non-transitory computer-readable storage medium storing a program to be executed by the processor. The program including instructions to receive an initiation of an automated descend-to-hover flight mode, determine a descend plane according to a rotorcraft location, wherein the descend plane includes an altitude profile that specifies target altitudes along a ground track and further includes a ground speed profile that specifies target ground speeds along the ground track, receive a command to enter an automated descend-to-hover mode, determine a relationship between a position of a rotorcraft and the descend plane, generate, in response receiving the command enter the automated descend-to-hover mode, and in response to determining that the relationship between the position of the rotorcraft and the descend plane exceeds a predetermined range, control commands for a main rotor system of the rotorcraft that cause the rotorcraft to autonomously intercept the descend plane, and generate, in response to receiving the command enter the automated descend-to-hover mode, and in response to determining that the relationship between the position of the rotorcraft and the descend plane is within the predetermined range or after intercepting the descend plane, control commands for the main rotor system of the rotorcraft that cause the rotorcraft to autonomously decelerate and to descend according to the descend plane.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A-5C illustrate an example of how a fly by wire (FBW) system autonomously descends and decelerates a rotorcraft upon entering an automated descend-to-hover flight mode;

DETAILED DESCRIPTION OF ILLUSTRATIVE EMBODIMENTS

Figure 1:
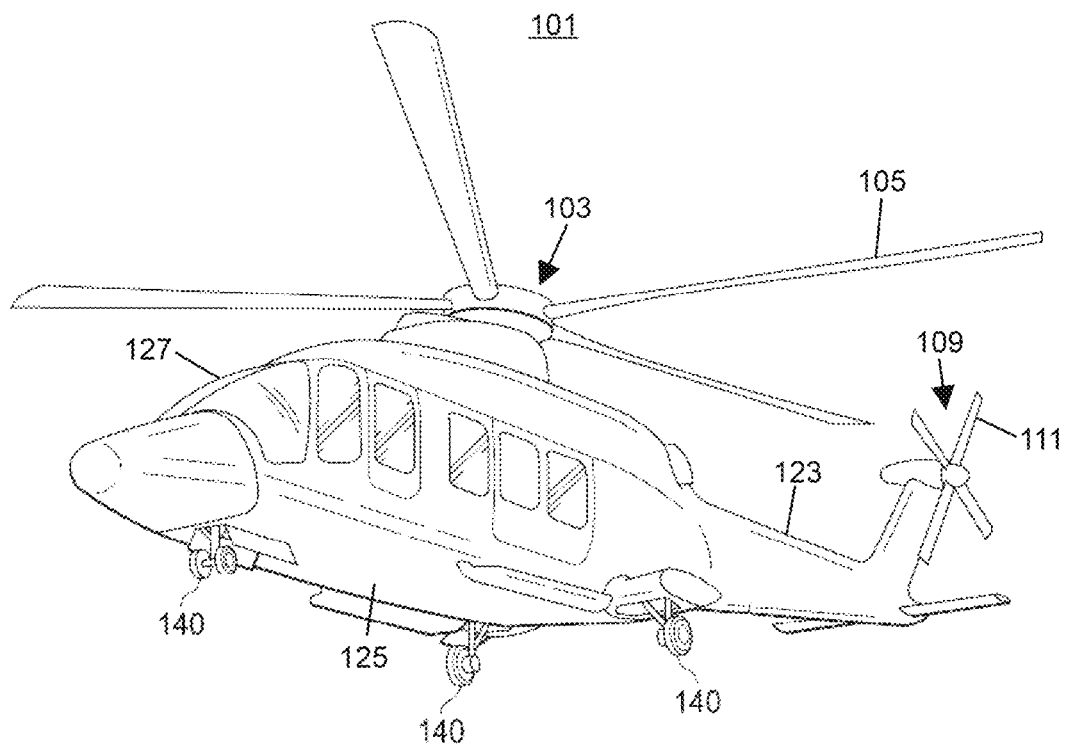
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. As rotorcraft have become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, mechanical-linkages between the flight controls (e.g., collective and cyclic inputs, etc.) and rotor assemblies have been replaced with a fly-by-wire (FBW) system, which electronically monitor the pilot's manipulation of the flight controls to generate flight control inputs, which are then used to adjust the rotor assemblies to effectuate piloting of the rotorcraft. In addition, the FBW system may also augment the flight control inputs derived from the pilot's manipulation of the flight controls (e.g., cyclic, collective, pedals, etc.) to improve stability of the rotorcraft and reduce the workload of the pilot. In particular, the augmented flight control inputs provided by the FBW system may serve to decouple physical flight characteristics so that a pilot is relieved from needing to compensate for some flight commands issued to the rotorcraft. As an example, the FBW system may automatically adjust power output by the engine to match a collective control input, apply collective or power correction during a cyclic control input, or the like.

In addition to adjusting flight control inputs to stabilize the aircraft while the pilot is actively piloting the rotorcraft, the FBW system may further provide augmented flight modes that automatically manipulate the flight control inputs (e.g., collective and cyclic inputs, etc.) to effectuate autonomous or semi-autonomous piloting of the rotorcraft.

Aspects of this disclosure provide an automated descend-to-hover flight mode in which the FBW system schedules a descend plane based on an initiation input by a pilot, and then autonomously descends and decelerates the rotorcraft according to the scheduled descend plane until the rotorcraft reaches a hover, or the rotorcraft otherwise exits the automated descend-to-hover flight mode. The scheduled descend plane may include an altitude profile that specifies target altitudes along a ground track. In some embodiments, the scheduled descend plane also includes a ground speed profile that specifies target ground speeds along the ground track.

In general, the target altitude specified by the altitude profile gradually decreases as the rotorcraft advances along the ground track. The rate in which the target altitude specified by the altitude profile gradually decreases in relation to the ground track is referred to the "scheduled descent rate" throughout this disclosure. The target ground speed specified by the ground speed profile may gradually decrease or otherwise remain fixed as the rotorcraft advances along the ground track. In some embodiments, the FBW system may determine the position of the rotorcraft in relation to the descend plane. The FBW system may, in response to determining that the relationship between the position of the rotorcraft and the descend plane exceeds a predetermined range, adjust the flight path of the rotorcraft to intercept the descend plane such that the rotorcraft comes within a threshold or range of the descend plane. After the descend plane is intercepted, the rotorcraft may then follow the descend plane until the rotorcraft is at the target altitude. Thus, when the altitude of the rotorcraft is below target, the FBW system may maintain the altitude of the rotorcraft until the rotorcraft's altitude is within a threshold of the target altitude specified by the altitude profile of the descend plane. Similarly, when the altitude of the rotorcraft is above target, the FBW system may reduce the rotorcraft's altitude at a rate that exceeds the scheduled descent rate and/or reduce the rotorcraft's ground speed below the target ground speed until the until the rotorcraft's altitude is within a threshold of the target altitude specified by the altitude profile. These and other aspects are described in greater detail below.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate (not shown) in order to selectively control the attitude, altitude and movement of the rotorcraft 101. The swashplate may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators (not shown). In some embodiments, the FBW system sends electrical signals to the tail rotor actuators or main rotor actuators to control flight of the rotorcraft 101.

Power is supplied to the main rotor system 103 and the anti-torque system by engines (not shown). There may be one or more engines, which may be controlled according to signals from the FBW system. The output of the engine is provided to a driveshaft, which is mechanically and operatively coupled to the rotor system 103 and the anti-torque system through a main rotor transmission and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

In some embodiments, the rotorcraft 101 may also have one or more wheels 140 that are used as landing gear. The rotorcraft 101 may have wheel sensors that provide signals to the FBW system indicating one or more of the wheels are in contact with a surface. For example, the wheels 140 may be mounted on hydraulic or pneumatic shock absorbers or struts, and wheel sensors may be disposed in the shock absorbers or struts and may have circuitry that monitors the pressure of the hydraulic or pneumatic medium to determine, based on the pressure of the system, whether the wheels 140 are depressed or have weight on them. In another example, a wheel sensors may each have circuitry that measures a displacement of a wheel 140 or connected element to determine, based on movement of the wheel 140, wheel assembly, support or the like, that the wheel 140 has weight applied to it or that a wheel 140 is in contact with the ground. Thus, the FBW system may determine the landing state of the rotorcraft 101 based on the number of wheels 140 in contact with the ground, and provide different flight augmentation features depending on the landing state. Additionally, while three sets of wheels 140 are shown in the illustrated embodiment, the embodiments are not limited to such as configuration, as more or fewer sets of wheels may be contemplated without deviating from the presented principles.

Figure 2:
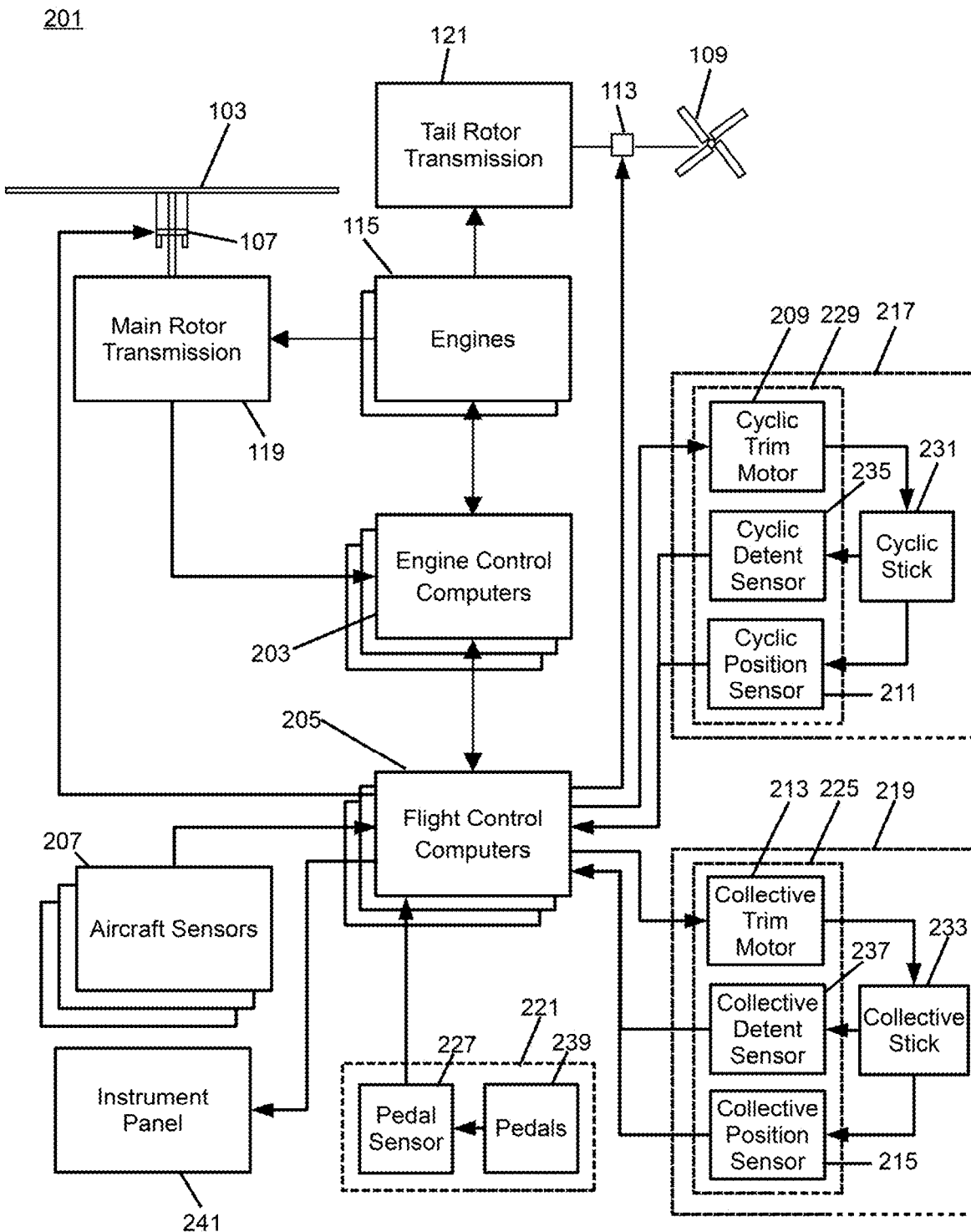
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (EC-CUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions, and the like. For example, the aircraft sensors 207 may include sensors for determining which, if any, wheels are in contact with the ground, or measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be out of detent (OOD). Likewise, the FCCs may determine that the stick is in detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
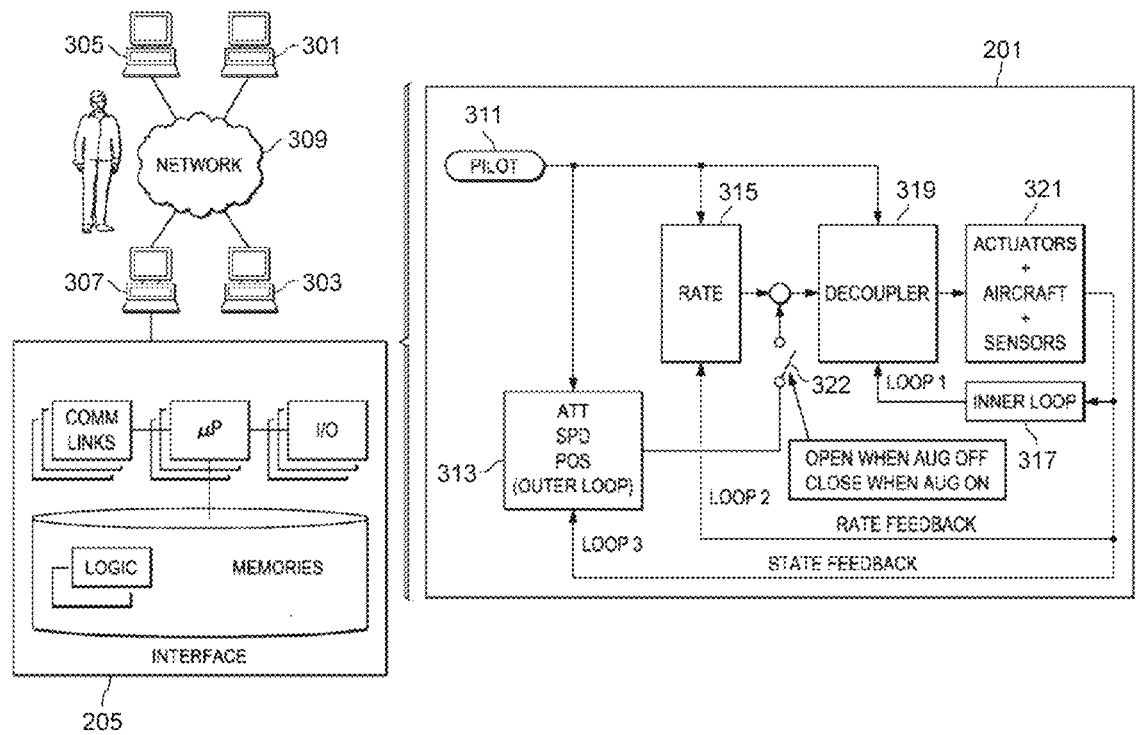
FIG. 3 representatively illustrates a three-loop flight control system 201 according to some embodiments.

Moving now to the operational aspects of flight control system 201, FIG. 3 illustrates in a highly schematic fashion, a manner in which flight control system 210 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop or rate loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop 317 and rate loop 315 may stay active, independent of various outer loop hold loop modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Aspects of this disclosure provide an automated descend-to-hover flight mode in which the FBW system schedules a descend plane based on an initiation by the pilot and then autonomously descends and decelerates the rotorcraft according to the scheduled descend plane until the rotorcraft reaches a hover above a ground location associated with the end of the scheduled descend plane, or the rotorcraft otherwise exits the automated descend-to-hover flight mode. The ground location associated with the descend plane may be a location above the ground where the rotorcraft 401 reaches a target altitude or airspeed determined by the descend plane.

Figure 4A:
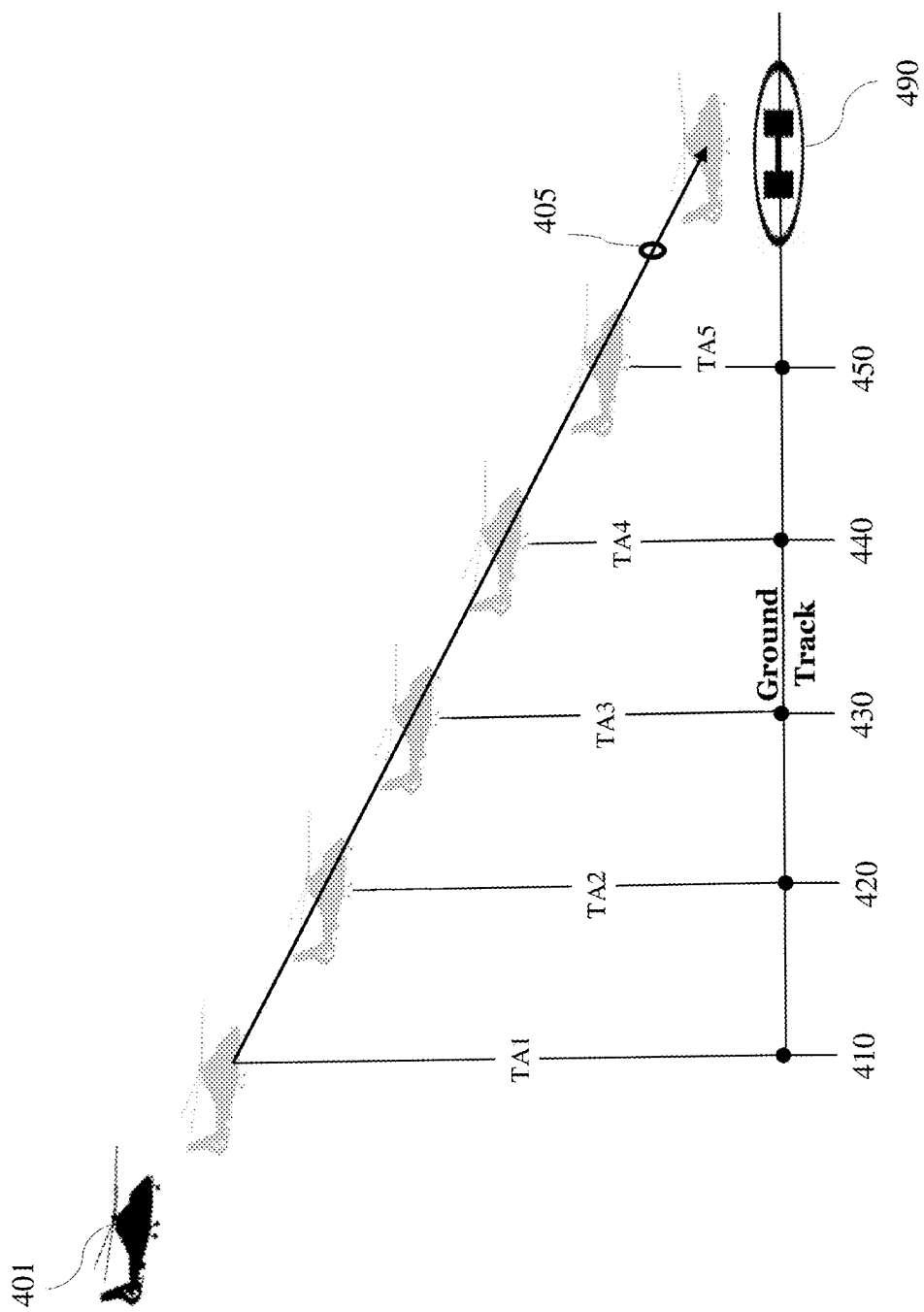
FIGS. 4A-4B illustrates scheduled descent planes for bringing a rotorcraft to a hover in accordance with an embodiment automated descend-to-hover flight mode.
Figure 4B:
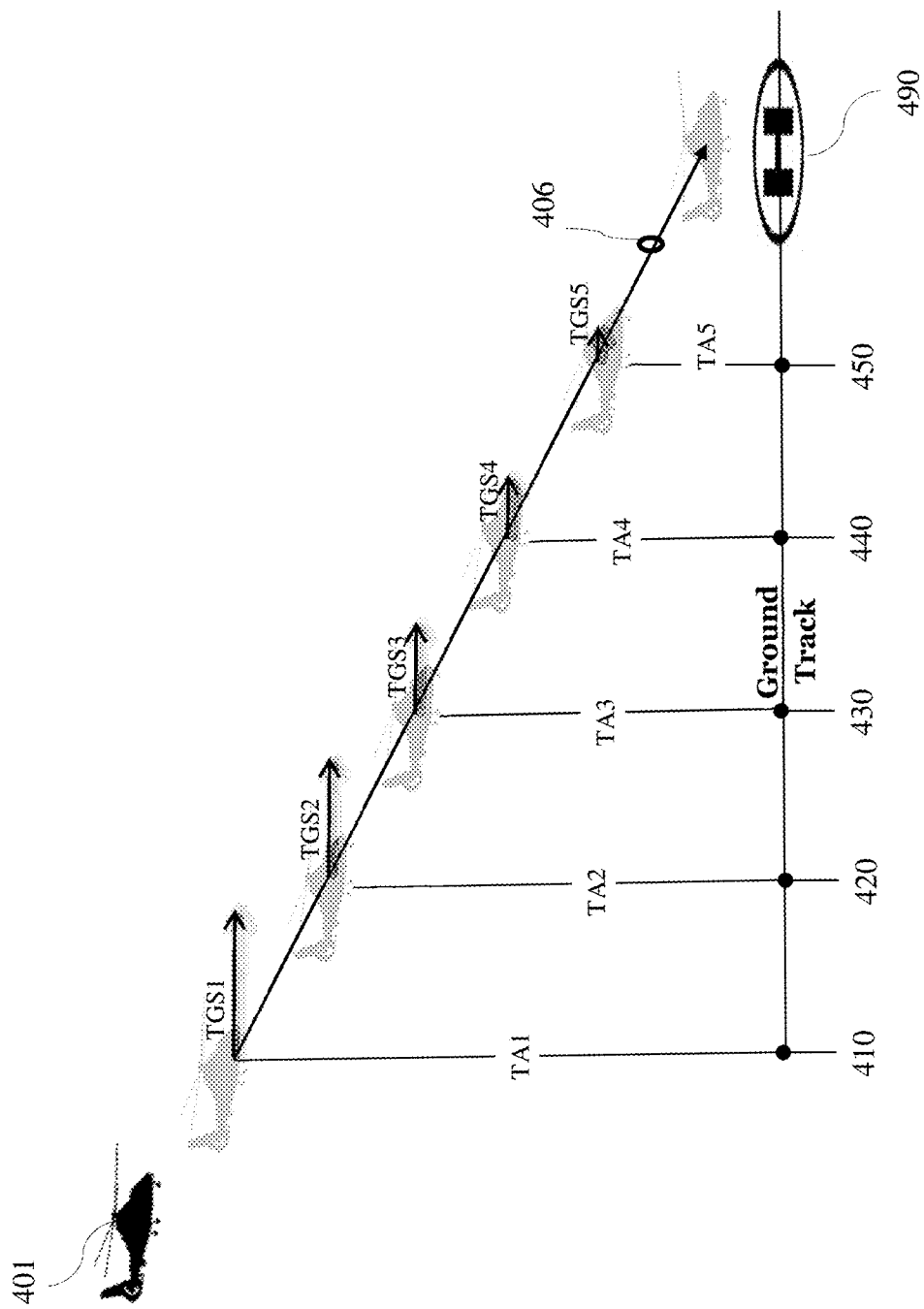

The scheduled descend plane may include an altitude profile that specifies target altitudes along a ground track. In some embodiments, the scheduled descend plane also includes a ground speed profile that specifies target ground speeds along the ground track. FIGS. 4A-4B depict descent planes 405, 406 for bringing a rotorcraft 401 to a hover at a ground location 490. The descent planes 405, 406 are defined according to an altitude profile that specifies target altitudes TA1-TA5 for positions 410-420 along the ground track, and the descend planes 405, 406 determine the ground location 490. In particular, the altitude profile of the descent planes 405, 406 specifies target altitude TA1 for position 410 on the ground track, target altitude TA2 for position 420 on the ground track, target altitude TA3 for position 430 on the ground track, target altitude TA4 for position 440 on the ground track, and target altitudes TA4 for position 450 on the ground track. The target altitudes TA1-TA5 gradually decrease according to a scheduled descent rate. In some embodiments, the scheduled descent rate remains constant such that the target altitude decreases by the same amount between consecutive positions 410-420 along the ground track. For example, the scheduled descent rate may be set to give a descend plane that is about 6 degrees. In other embodiments, the scheduled descent rate varies such that the target altitude decreases by different amounts between consecutive positions 410-420 along the ground track.

The descent plane 406 is further defined according to a ground speed profile that specifies target ground speeds TGS1-TGS5 for positions 410-420 along the ground track. In particular, the ground speed profile of the descent planes 405, 406 specifies target ground speed TGS1 for position 410 on the ground track, target ground speed TGS2 for position 420 on the ground track, target ground speed TGS3 for position 430 on the ground track, target ground speed TGS4 for position 440 on the ground track, and target ground speed TGS5 for position 450 on the ground track. In this example, the target ground speeds TGS1-TGS5 specified by the ground speed profile corresponding to the descent plane 406 gradually decrease at a scheduled rate of deceleration such that the target ground speeds TGS4 is less than the target ground speed TGS5, and so on and so forth. The scheduled rate of deceleration may vary or be held constant. The descent plane 405 may not be defined by a ground speed profile, but instead may allow the ground speed of the rotorcraft 401 to fluctuate within a predetermined range that is independent of the position of the rotorcraft 401 along the ground track.

Figure 5A:
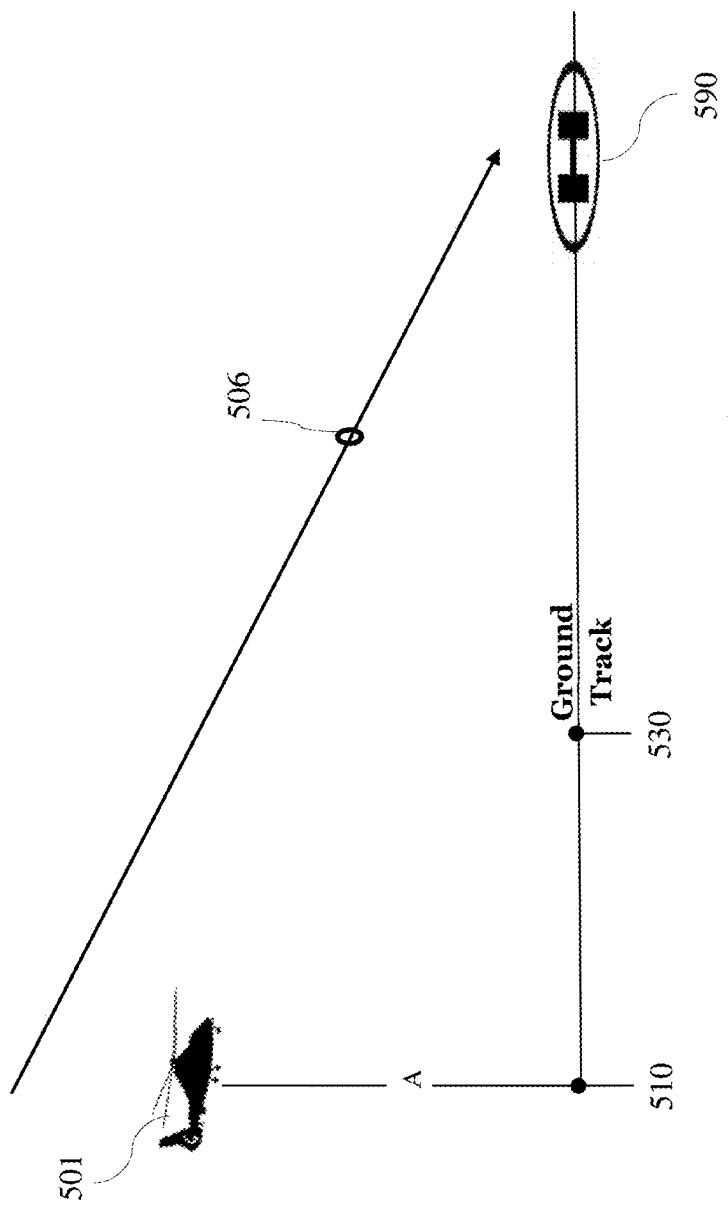
Figure 5C:
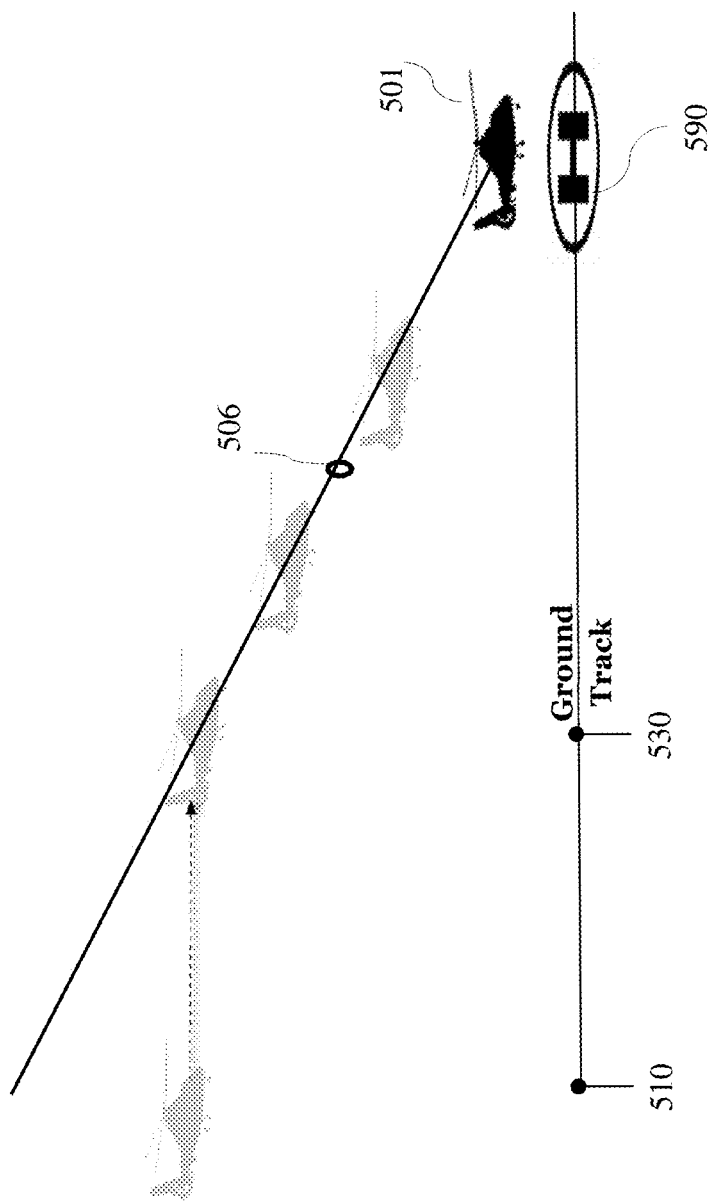

When the altitude of a rotorcraft is below a target altitude specified by the altitude profile of a scheduled descend plane, the FBW system may maintain the altitude of the rotorcraft as the rotorcraft advances along the ground track until the altitude of the rotorcraft is within a threshold of the target altitude specified by the altitude profile. FIGS. 5A-5C depict how a FBW system autonomously descends and decelerates a rotorcraft 501 according to a scheduled descend plane 506 when an initial altitude of the rotorcraft 501 is below a target altitude of an altitude profile corresponding to the scheduled descend plane 506. As shown, the altitude (A) of the rotorcraft 501 is below a target altitude when the rotorcraft 501 is at position 510 on the ground track. The FBW system maintains the altitude of altitude (A) of the rotorcraft 501 as the rotorcraft 501 advances along the ground track until the altitude (A) of the rotorcraft 501 is within a threshold of the target altitude specified by the altitude profile at position 530 on the ground track. Thereafter, the FBW system reduces the altitude (A) of the rotorcraft 501 according to a scheduled descent rate until the rotorcraft 501 reaches a hover at the ground location 590.

The FBW system may provide the autonomous approach to hover, however, a pilot may override the autonomous commands at any time during the approach to hover procedure. In some embodiments, the FBW system may continuously monitor pilot inputs, to determine the detent status of each pilot control. The FBW system may autonomously execute commands to implement the approach to hover when the pilot controls are in detent, and may respond purely to pilot commands when the pilot controls are out of detent. Thus, a pilot may engage the automated approach to hover, and the FBW system may autonomously follow the scheduled descend plane until the pilot retakes command of the pilot controls to maneuver the rotorcraft, for example, to adjust the ground track or descend plane, or to avoid a structure, bird, or another aircraft. In some embodiments, the FBW system may terminate the automated approach to hover after the pilot retakes control or the rotorcraft otherwise goes out of detent. In other embodiments, the rotorcraft may pause or stop the automated approach to hover and respond to pilot controls when the rotorcraft goes out of detent, and may resume the automated approach to hover if the pilot controls go in detent, with the pilot releasing manual control of the pilot controls. For example, the pilot may visually estimate a hover location, and initiate the automated approach to hover process. During the descent to hover, the pilot may modify the track or descend plane by manually overriding the automated approach to hover process by, for example, manually controlling the rotorcraft. Thus, the pilot may dynamically adjust or correct the descend plane to modify the ground location associated with the descend plane. The FBW system may, for example, determine a descend plane in response to a pilot initiation of the automated approach to hover process, and then move the rotorcraft along a first portion of the descend plane until the pilot overrides the automated approach to hover by manually controlling the rotorcraft. Once the pilot releases manual control of the rotorcraft, the FBW system may continue on along the descend plane by moving the rotorcraft along a second portion of the descend plane from the new, adjusted location of the rotorcraft.

When the altitude of a rotorcraft is above a target altitude specified by an altitude profile of a scheduled descend plane, the FBW system may reduce the altitude of the rotorcraft at a rate that exceeds the scheduled descent rate until the altitude of the rotorcraft is within a threshold of the target altitude specified by the altitude profile for the rotorcraft's position on the ground track.

Figure 6A:
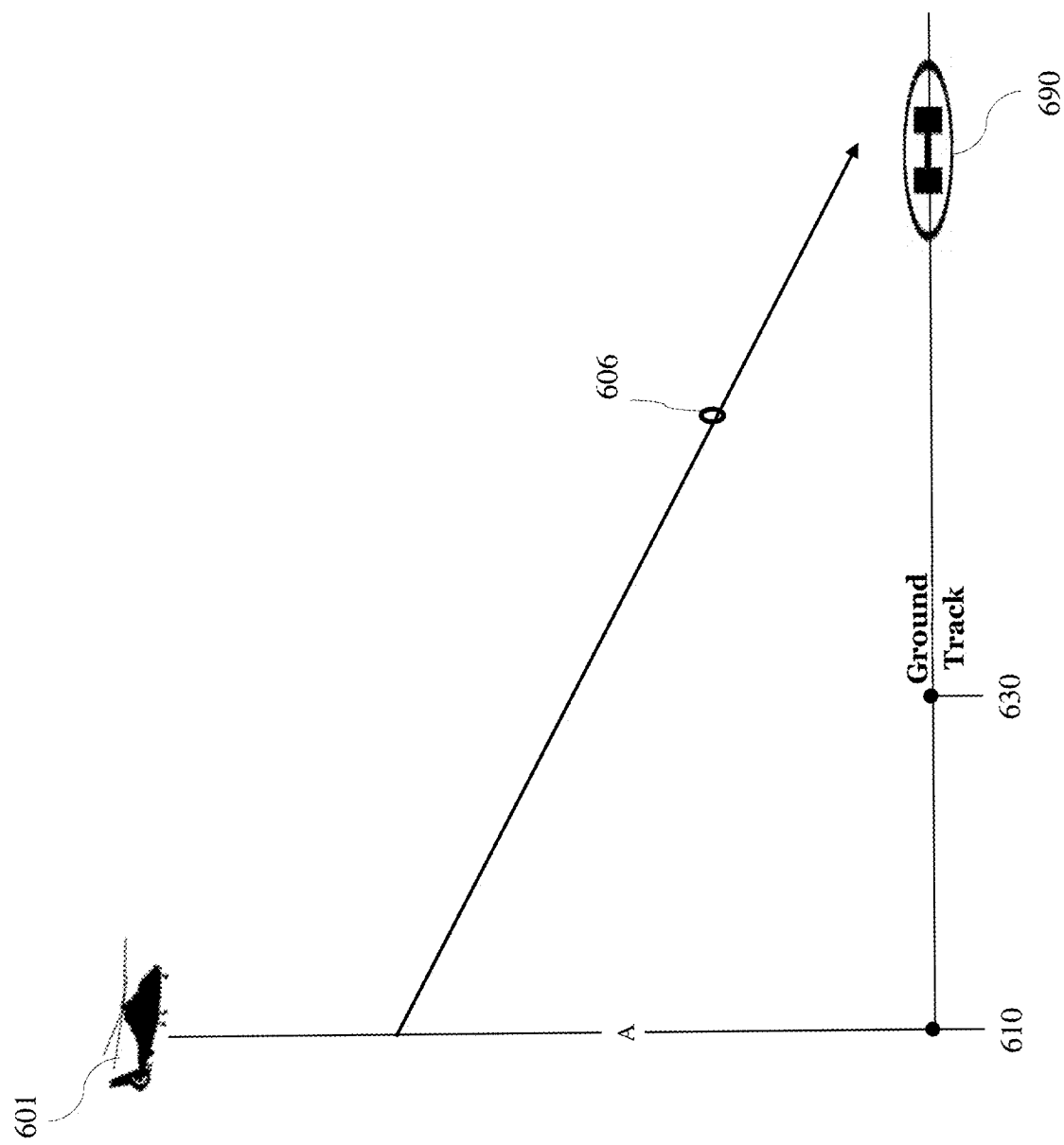
FIGS. 6A-6C are diagrams of another example of how an FBW system autonomously descends and decelerates a rotorcraft upon entering an automated descend-to-hover flight mode.
Figure 6B:
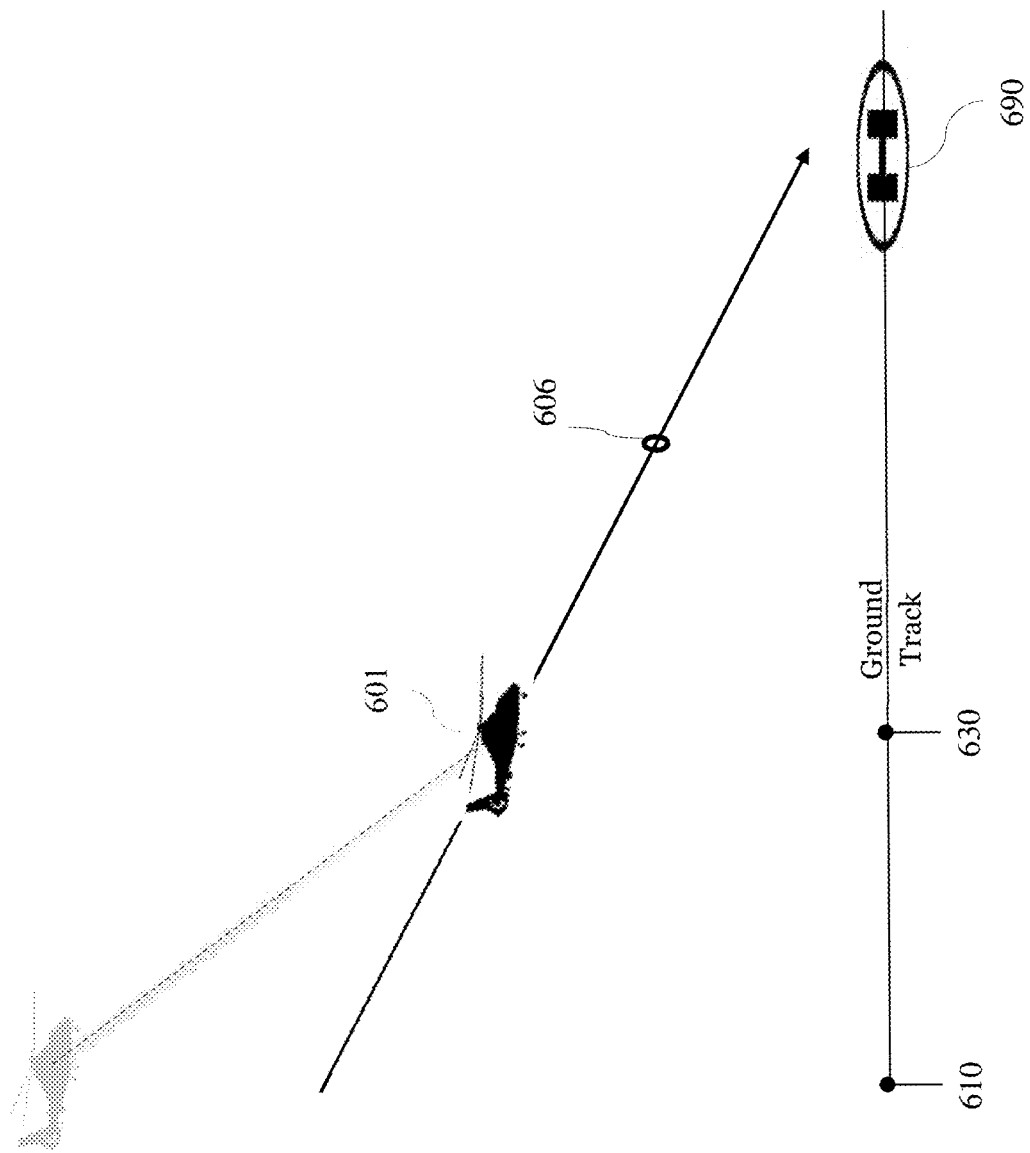
Figure 6C:
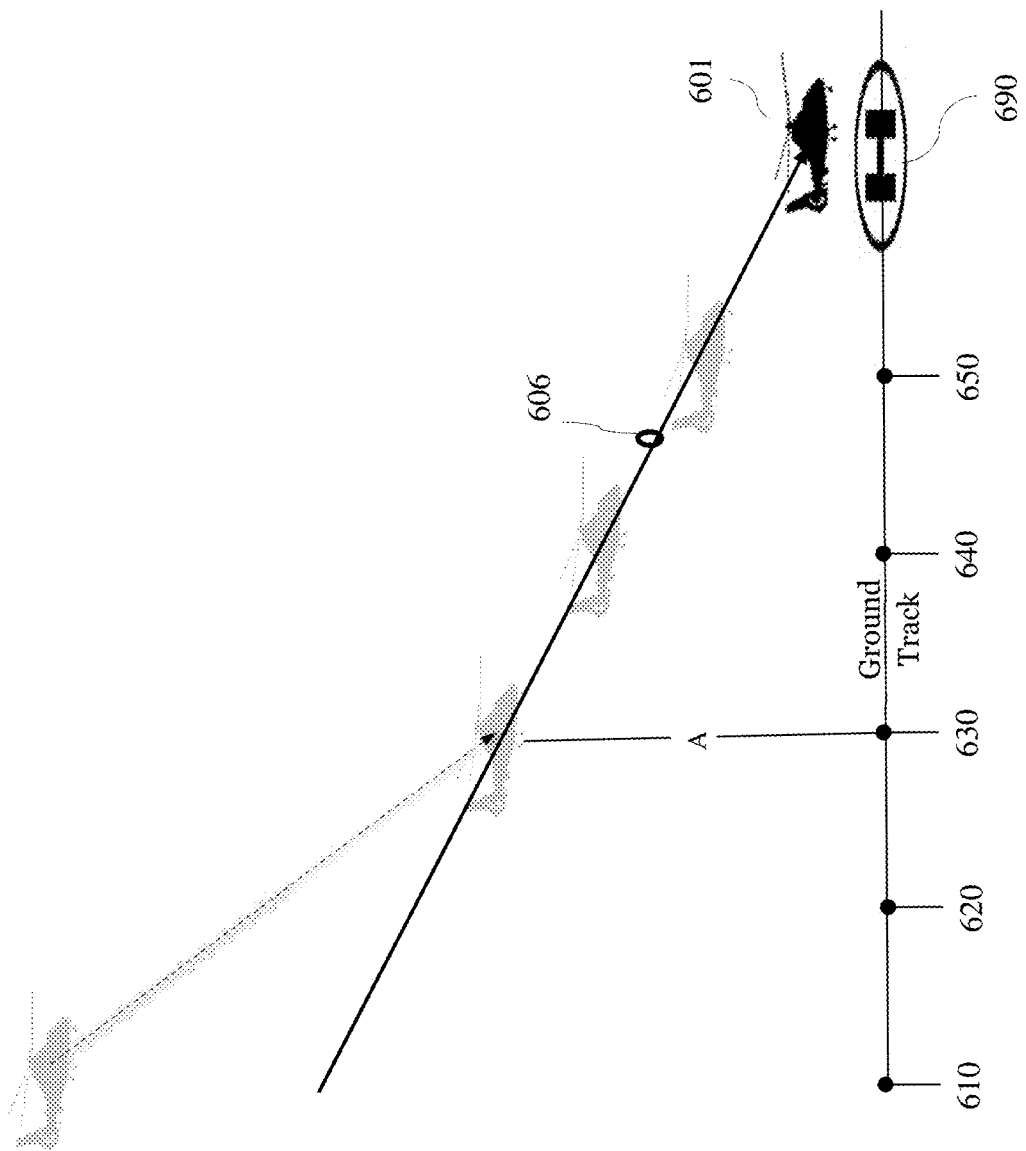

FIGS. 6A-6C depict how a FBW system autonomously descends and decelerates a rotorcraft 601 according to a scheduled descend plane 606 when an initial altitude of the rotorcraft 601 is above a target altitude of an altitude profile corresponding to the scheduled descend plane 606. As shown, the altitude (A) of the rotorcraft 601 is above a target altitude when the rotorcraft 601 is at position 610 on the ground track. In response, the FBW system reduces the altitude of altitude (A) of the rotorcraft 601 at a rate that exceeds the scheduled descent rate of the descend plane 606 until the altitude (A) of the rotorcraft is within a threshold of the target altitude, which occurs when the rotorcraft reaches position 630 on the ground track. Thereafter, the FBW system reduces the altitude (A) of the rotorcraft 601 according to the scheduled descent rate until the rotorcraft 601 reaches a hover at the ground location 690.

Figure 7:
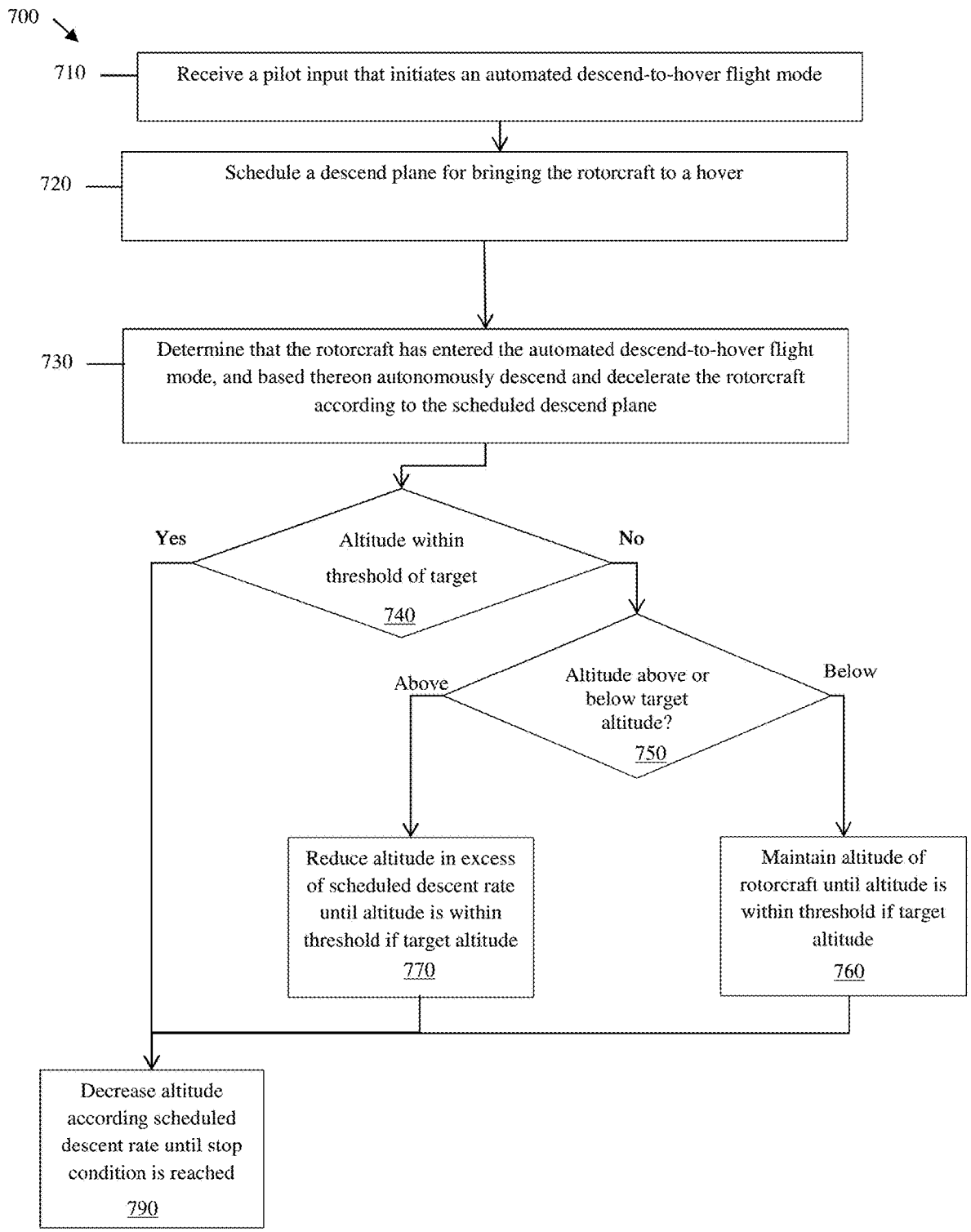
FIG. 7 is a flowchart of an embodiment method for autonomously descending and decelerating a rotorcraft in accordance with an automated descend-to-hover flight mode.

FIG. 7 is a flowchart of an embodiment method 700 for controlling a rotorcraft in accordance with an automated descend-to-hover flight mode, as may be performed by a FBW system. An FCC or other portion of the FBW system may generate commands to control, in response to the rotorcraft entering an automated descend-to-hover mode, the main rotor system to cause the rotorcraft to autonomously decelerate and to descend according to the altitude profile of the descend plane until the rotorcraft reaches a hover. At step 710, the FBW system receives a pilot initiation for an automated descend-to-hover flight mode. In some embodiments, the pilot may initiate the automated descend-to-hover mode by pressing a button, toggling a switch, interacting with an FCC, flight management computer, flight director, or the like, or otherwise interacting with a system of the rotorcraft. At step 720, the FBW system schedules a descend plane for bringing the rotorcraft to a hover. In some embodiments, the descend plane is determined from the rotorcraft location. At step 730, the FBW system determines that the rotorcraft has entered the automated descend-to-hover flight mode, and based thereon autonomously descends and decelerates the rotorcraft according to the scheduled descend plane. In some embodiments, the scheduled descend plane may be predetermined and automatically implemented by the FBW system, or maybe entered by a pilot, or selected by a pilot from a predetermined set of descend plane profiles.

At step 740, the FBW system determines whether the altitude of the rotorcraft is within a threshold of a target altitude specified by the scheduled descend plane. If not, the FBW system determines whether the altitude of the rotorcraft is above or below the target altitude at step 750. If the altitude of the rotorcraft is deemed to be below the target altitude at step 750, then the method 700 proceeds to step 760, where the FBW system maintains the attitude of the rotorcraft as the rotorcraft advances along the ground track until the altitude of the of the rotorcraft is within a threshold of the target altitude. If the altitude of the rotorcraft is deemed to be above the target altitude at step 750, then the method 700 proceeds to step 770, where the FBW system reduces the altitude of the rotorcraft at a rate that exceeds the scheduled descent rate until the altitude of the of the rotorcraft is with a threshold of the target altitude.

Once the altitude of the rotorcraft is within a threshold of the target altitude for a given position of the rotorcraft on the ground track, the method 700 proceeds to step 790, where the FBW system decreases the altitude of the rotorcraft according to the scheduled descent rate until a stop condition is reached. The stop condition may be reached when the rotorcraft reaches a hover. Alternatively, the stop condition may be reached when the rotorcraft exits the automated descend-to-hover flight mode. The rotorcraft may be prompted to exit the automated descend-to-hover flight mode based on a command by the pilot. Alternatively, the rotorcraft may be prompted to exit the automated descend-to-hover flight mode based on an autonomous decision/command by the FBW system, as may occur when the FBW system detects a condition or flight parameter that warrants exiting the automated descend-to-hover flight mode.

Figure 8:
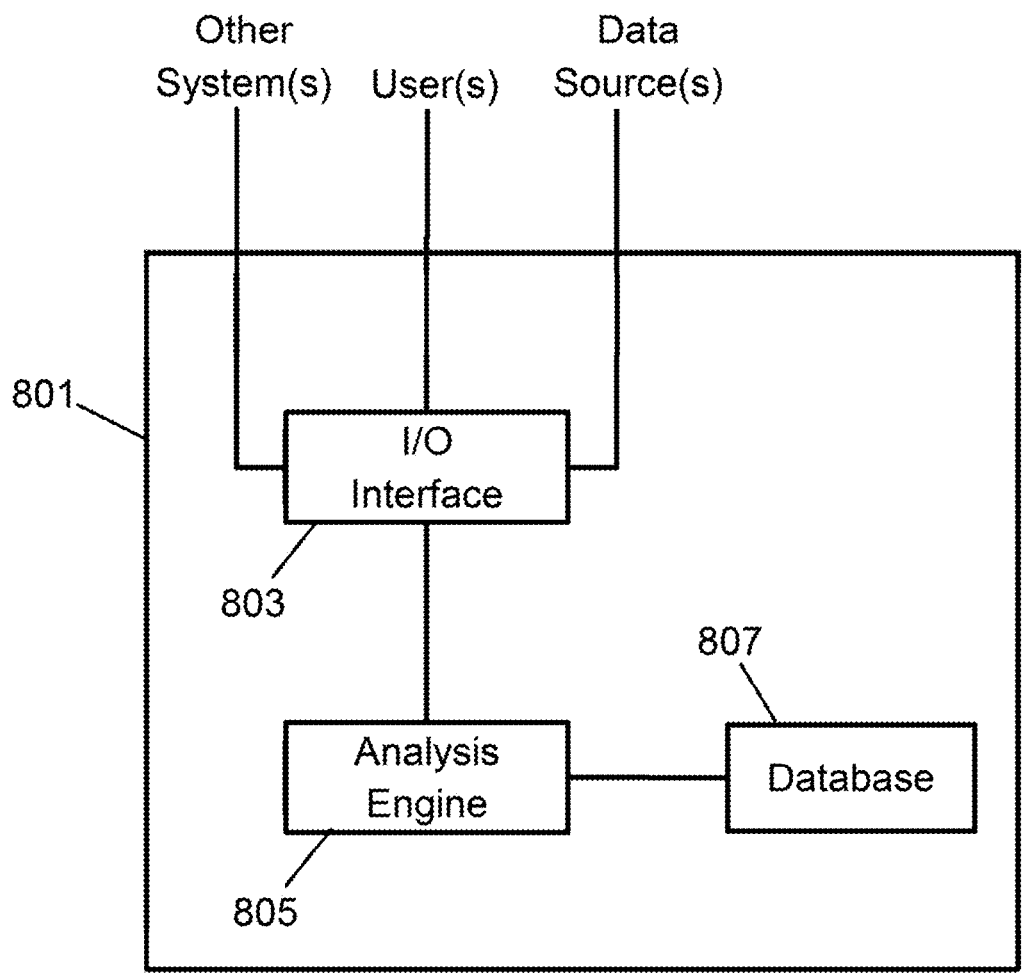
FIG. 8 illustrates an embodiment computer system.

FIG. 8 illustrates a computer system 801. The computer system 801 may be FCCs or the like, and may be configured for performing one or more functions with regard to the operation of the flight control system 201 and the method 500, as described herein. Further, any processing and analysis can be partly or fully performed by the computer system 801. The computer system 801 can be partly or fully integrated with other aircraft computer systems or can be partly or fully removed from the rotorcraft. The computer system 801 can include an input/output (I/O) interface 803, an analysis engine 805, and a database 807. Alternative embodiments can combine or distribute the I/O interface 803, the analysis engine 805, and the database 807, as desired. Embodiments of the computer system 801 may include one or more computers that include one or more processors and memories configured for performing tasks described herein. This can include, for example, a computer having a central processing unit (CPU) and non-transitory computer readable medium or non-volatile memory that stores a program or software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 803 can provide a communication link between external users, systems, and data sources and components of the computer system 801. The I/O interface 803 can be configured for allowing one or more users to input information to the computer system 801 via any known input device. Examples can include a keyboard, mouse, touch screen, and/or any other desired input device. The I/O interface 803 can be configured for allowing one or more users to receive information output from the computer system 801 via any known output device. Examples can include a display monitor, a printer, cockpit display, and/or any other desired output device. The I/O interface 803 can be configured for allowing other systems to communicate with the computer system 801. For example, the I/O interface 803 can allow one or more remote computer(s) to access information, input information, and/or remotely instruct the computer system 801 to perform one or more of the tasks described herein. The I/O interface 803 can be configured for allowing communication with one or more remote data sources. For example, the I/O interface 803 can allow one or more remote data source(s) to access information, input information, and/or remotely instruct the computer system 801 to perform one or more of the tasks described herein.

The database 807 provides persistent data storage for the computer system 801. Although the term "database" is primarily used, a memory or other suitable data storage arrangement may provide the functionality of the database 807. In alternative embodiments, the database 807 can be integral to or separate from the computer system 801 and can operate on one or more computers. The database 807 preferably provides non-volatile data storage for any information suitable to support the operation of the flight control system 201 and the method 500, including various types of data discussed further herein. The analysis engine 805 can include various combinations of one or more processors, memories, and software components.

An embodiment method for controlling a rotorcraft includes receiving, by a fly-by-wire (FBW) system of the rotorcraft, a pilot input that initiates an automated descend-to-hover flight mode, scheduling, by the FBW system, a descend plane for bringing the rotorcraft to a hover, and autonomously descending and decelerating the rotorcraft according to the descend plane in response to determining that the rotorcraft has entered the automated descend-to-hover flight mode and until the rotorcraft reaches a hover or the rotorcraft exits the automated descend-to-hover flight mode.

In some embodiments, autonomously descending and decelerating the rotorcraft according to the descend plane further includes automatically adjusting an altitude of the rotorcraft according to a target altitude specified by an altitude profile as the rotorcraft advances along a ground track, where the target altitude specified by the altitude profile decreases at a scheduled descent rate as the rotorcraft advances along the ground track. In some embodiments, automatically adjusting the altitude of the rotorcraft according to the target altitude specified by the altitude profile includes maintaining the altitude of the rotorcraft as the rotorcraft advances along the ground track in response to determining that the altitude of the rotorcraft is below the target altitude specified by the altitude profile for a position of the rotorcraft along the ground track and until the altitude of the rotorcraft is within a threshold of the target altitude specified by the altitude profile for the position of the rotorcraft along the ground track. In some embodiments, automatically adjusting the altitude of the rotorcraft according to the target altitude specified by the altitude profile includes reducing, in response to determining that the altitude of the rotorcraft is above the target altitude specified by the altitude profile for a position of the rotorcraft along the ground track, the altitude of the rotorcraft at a rate that exceeds the scheduled descent rate until the altitude of the rotorcraft is within a threshold of the target altitude specified by the altitude profile for the position of the rotorcraft along the ground track. In some embodiments, automatically adjusting the altitude of the rotorcraft according to the target altitude specified by the altitude profile further includes reducing, in response to determining that the altitude of the rotorcraft is above the target altitude specified by the altitude profile for the position of the rotorcraft along the ground track, a ground speed of the rotorcraft below a target ground speed until the altitude of the rotorcraft is within a threshold of the target altitude specified by the altitude profile for the position of the rotorcraft along the ground track. In some embodiments, automatically adjusting the altitude of the rotorcraft according to the target altitude specified by the altitude profile includes maintaining a current ground speed of the rotorcraft within a predetermined range as the rotorcraft advances along the ground track, the predetermined range being independent of a position of the rotorcraft along the ground track. In some embodiments, the descend plane further includes a ground speed profile specifying a target ground speed for each position along the ground track, the target ground speed specified by the ground speed profile decreasing at a rate of deceleration as the rotorcraft advances along the ground track. In some embodiments, autonomously descending and decelerating the rotorcraft according to the descend plane further includes adjusting a ground speed of the rotorcraft according to a target ground speed specified by a ground speed profile for a position of the rotorcraft as the rotorcraft advances along the ground track, the target ground speed specified by the ground speed profile decreasing at a scheduled rate of deceleration as the rotorcraft advances along the ground track. In some embodiments, autonomously descending and decelerating the rotorcraft according to the descend plane further includes descending and decelerating the rotorcraft according to a first portion of the descend plane until a pilot overrides automated control of the rotorcraft, and descending and decelerating the rotorcraft according to a second portion of the descend plane after the pilot ceases overriding the automated control of the rotorcraft and until a hover is reached.

An embodiment rotorcraft includes a main rotor system, and a fly-by-wire (FBW) system electrically connected to actuators linked to the main rotor system. The FBW system is operable to receive an input that identifies, for an automated descend-to-hover flight mode, determine a descend plane according to the initial aircraft location, wherein the descend plane includes an altitude profile that specifies target altitudes along a ground track, and control, in response to the rotorcraft entering an automated descend-to-hover mode, the main rotor system to cause the rotorcraft to autonomously decelerate and to descend according to the altitude profile of the descend plane until the rotorcraft reaches a hover.

In some embodiments, the descend plane further includes a ground speed profile that specifies target ground speeds along the ground track, and the FBW system is operable to control the main rotor system to cause the rotorcraft to decelerate the rotorcraft and to descend the rotorcraft according to the altitude profile and the ground speed profile of the descend plane until the rotorcraft reaches the hover. In some embodiments, the FBW system is configured to control the main rotor system to cause the rotorcraft to autonomously decelerate and to descend by automatically adjusting an altitude of the rotorcraft according to the target altitudes of the altitude profile as the rotorcraft advances along a ground track, where the target altitudes of the altitude profile decrease at a scheduled descent rate as the rotorcraft advances along the ground track. In some embodiments, the FBW system is configured to control the main rotor system to cause the rotorcraft to autonomously decelerate and to descend by maintaining the altitude of the rotorcraft as the rotorcraft advances along the ground track in response to determining that the altitude of the rotorcraft is below a target altitude specified by the altitude profile for a position of the rotorcraft along the ground track and until the altitude of the rotorcraft is within a threshold of a target altitude specified by the altitude profile for the position of the rotorcraft along the ground track. In some embodiments, the FBW system is configured to control the main rotor system to cause the rotorcraft to autonomously decelerate and to descend by reducing, in response to determining that the altitude of the rotorcraft is above the target altitude specified by the altitude profile for a position of the rotorcraft along the ground track, the altitude of the rotorcraft at a rate that exceeds the scheduled descent rate until the altitude of the rotorcraft is within a threshold of the target altitude specified by the altitude profile for the position of the rotorcraft along the ground track.

An embodiment device includes a processor, and a non-transitory computer-readable storage medium storing a program to be executed by the processor. The program including instructions to receive an initiation of an automated descend-to-hover flight mode, determine a descend plane according to a rotorcraft location, wherein the descend plane includes an altitude profile that specifies target altitudes along a ground track and further includes a ground speed profile that specifies target ground speeds along the ground track, receive a command to enter an automated descend-to-hover mode, determine a relationship between a position of a rotorcraft and the descend plane, generate, in response receiving the command enter the automated descend-to-hover mode, and in response to determining that the relationship between the position of the rotorcraft and the descend plane exceeds a predetermined range, control commands for a main rotor system of the rotorcraft that cause the rotorcraft to autonomously intercept the descend plane, and generate, in response to receiving the command enter the automated descend-to-hover mode, and in response to determining that the relationship between the position of the rotorcraft and the descend plane is within the predetermined range or after intercepting the descend plane, control commands for the main rotor system of the rotorcraft that cause the rotorcraft to autonomously decelerate and to descend according to the descend plane.

In some embodiments, the instructions to generate control commands for the main rotor system of the rotorcraft that cause the rotorcraft to autonomously decelerate and to descend according the descend plane include instructions to generate control commands for the main rotor system of the rotorcraft that cause the rotorcraft to autonomously decelerate and to descend according to the descend plane until the rotorcraft reaches a hover. In some embodiments, the instructions to generate control commands for the main rotor system of the rotorcraft that cause the rotorcraft to autonomously decelerate and to descend according the descend plane include instructions to generate control commands for the main rotor system of the rotorcraft that cause the rotorcraft to autonomously decelerate and to descend according to a first portion of the descend plane until the pilot overrides automated control of the rotorcraft and generate control commands for the main rotor system of the rotorcraft that cause the rotorcraft to autonomously decelerate and to descend according to a second portion of the descend plane after the pilot ceases overriding the automated control of the rotorcraft and until a hover is reached. In some embodiments, the instructions to generate control commands for the main rotor system of the rotorcraft that cause the rotorcraft to autonomously decelerate and to descend according the descend plane include instructions to generate control commands for the main rotor system of the rotorcraft that automatically adjusting an altitude of the rotorcraft according to the target altitudes of the altitude profile as the rotorcraft advances along a ground track, where the target altitudes of the altitude profile decrease at a scheduled descent rate as the rotorcraft advances along the ground track.

In some embodiments, the instructions to generate control commands for the main rotor system of the rotorcraft that cause the rotorcraft to autonomously intercept the descend plane include instructions to generate control commands for the main rotor system of the rotorcraft that cause the rotorcraft to maintain an altitude of the rotorcraft as the rotorcraft advances along the ground track in response to determining that the altitude of the rotorcraft is below a target altitude specified by the altitude profile for the position of the rotorcraft along the ground track and until the altitude of the rotorcraft is within a threshold of the target altitude specified by the altitude profile for the position of the rotorcraft along the ground track. In some embodiments, the instructions to generate control commands for the main rotor system of the rotorcraft that cause the rotorcraft to autonomously intercept the descend plane include instructions to generate control commands for the main rotor system of the rotorcraft that cause the rotorcraft to reduce, in response to determining that an altitude of the rotorcraft is above a target altitude specified by the altitude profile for the position of the rotorcraft along the ground track, the altitude of the rotorcraft at a rate that exceeds a scheduled descent rate of the descend plane until the altitude of the rotorcraft is within a threshold of the target altitude specified by the altitude profile for the position of the rotorcraft along the ground track.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for controlling a rotorcraft, the method comprising:
   receiving, by a fly-by-wire (FBW) system of the rotorcraft, a pilot input that initiates an automated descend-to-hover flight mode;
   scheduling, by the FBW system, a descend plane for bringing the rotorcraft to a hover; and
   autonomously descending and decelerating the rotorcraft according to the descend plane in response to determining that the rotorcraft has entered the automated descend-to-hover flight mode and until the rotorcraft reaches a hover or the rotorcraft exits the automated descend-to-hover flight mode, wherein the autonomously descending and decelerating the rotorcraft according to the descend plane comprises automatically adjusting an altitude of the rotorcraft according to a target altitude specified by an altitude profile as the rotorcraft advances along a ground track by at least maintaining the altitude of the rotorcraft as the rotorcraft advances along the ground track in response to determining that the altitude of the rotorcraft is below the target altitude specified by the altitude profile for a position of the rotorcraft along the ground track and until the altitude of the rotorcraft is within a threshold of the target altitude specified by the altitude profile for the position of the rotorcraft along the ground track.

2. The method of claim 1, wherein autonomously descending and decelerating the rotorcraft according to the descend plane further comprises:
   descending and decelerating the rotorcraft according to a first portion of the descend plane until a pilot overrides automated control of the rotorcraft; and
   descending and decelerating the rotorcraft according to a second portion of the descend plane after the pilot ceases overriding the automated control of the rotorcraft and until a hover is reached.

3. The method of claim 1, wherein the target altitude specified by the altitude profile decreases at a scheduled descent rate as the rotorcraft advances along the ground track.

4. The method of claim 3, wherein the autonomously descending and decelerating the rotorcraft further comprises:
   autonomously descending and decelerating the rotorcraft according to the descend plane from the target altitude specified by the altitude profile for the position of the rotorcraft along the ground track after the altitude of the rotorcraft is within the threshold of the target altitude specified by the altitude profile for the position of the rotorcraft along the ground track.

5. The method of claim 3, wherein automatically adjusting the altitude of the rotorcraft according to the target altitude specified by the altitude profile comprises:
   maintaining a current ground speed of the rotorcraft within a predetermined range as the rotorcraft advances along the ground track, the predetermined range being independent of a position of the rotorcraft along the ground track.

6. The method of claim 3, wherein the descend plane further includes a ground speed profile specifying a target ground speed for each position along the ground track, the target ground speed specified by the ground speed profile decreasing at a rate of deceleration as the rotorcraft advances along the ground track.

7. The method of claim 3, wherein autonomously descending and decelerating the rotorcraft according to the descend plane further comprises:
   adjusting a ground speed of the rotorcraft according to a target ground speed specified by a ground speed profile for a position of the rotorcraft as the rotorcraft advances along the ground track, the target ground speed specified by the ground speed profile decreasing at a scheduled rate of deceleration as the rotorcraft advances along the ground track.

8. The method of claim 3, wherein automatically adjusting the altitude of the rotorcraft according to the target altitude specified by the altitude profile comprises:
   reducing, in response to determining that the altitude of the rotorcraft is above the target altitude specified by the altitude profile for a position of the rotorcraft along the ground track, the altitude of the rotorcraft at a rate that exceeds the scheduled descent rate until the altitude of the rotorcraft is within a threshold of the target altitude specified by the altitude profile for the position of the rotorcraft along the ground track.

9. The method of claim 3, wherein automatically adjusting the altitude of the rotorcraft according to the target altitude specified by the altitude profile further comprises:
   reducing, in response to determining that the altitude of the rotorcraft is above the target altitude specified by the altitude profile for the position of the rotorcraft along the ground track, a ground speed of the rotorcraft below a target ground speed until the altitude of the rotorcraft is within a threshold of the target altitude specified by the altitude profile for the position of the rotorcraft along the ground track.

10. A rotorcraft, comprising:
    a main rotor system; and
    a fly-by-wire (FBW) system electrically connected to actuators linked to the main rotor system, the FBW system operable to:
       receive an input that identifies, for an automated descend-to-hover flight mode, an initiation of the mode;
       determine a descend plane according to predetermined parameters, wherein the descend plane includes an altitude profile that specifies target altitudes along a ground track; and
       control, in response to the rotorcraft entering an automated descend-to-hover mode, the main rotor system to cause the rotorcraft to autonomously decelerate and to descend according to the altitude profile of the descend plane until the rotorcraft reaches a hover, wherein the FBW system being operable to control the main rotor system to cause the rotorcraft to FBW system being operable to automatically adjust an altitude of the rotorcraft according to the target altitudes of the altitude profile as the rotorcraft advances along a ground track by at least maintaining the altitude of the rotorcraft as the rotorcraft advances along the ground track in response to determining that the altitude of the rotorcraft is below a target altitude specified by the altitude profile for a position of the rotorcraft along the ground track and until the altitude of the rotorcraft is within a threshold of a target altitude specified by the altitude profile for the position of the rotorcraft along the ground track.

11. The rotorcraft of claim 10, wherein the descend plane further includes a ground speed profile that specifies target ground speeds along the ground track; and
    wherein the FBW system is operable to control the main rotor system to cause the rotorcraft to decelerate the rotorcraft and to descend the rotorcraft according to the altitude profile and the ground speed profile of the descend plane until the rotorcraft reaches the hover.

12. The rotorcraft of claim 10, wherein the target altitudes of the altitude profile decrease at a scheduled descent rate as the rotorcraft advances along the ground track.

13. The rotorcraft of claim 12, wherein the FBW system is configured to control the main rotor system to cause the rotorcraft to autonomously decelerate and to descend by reducing, in response to determining that the altitude of the rotorcraft is above the target altitude specified by the altitude profile for a position of the rotorcraft along the ground track, the altitude of the rotorcraft at a rate that exceeds the scheduled descent rate until the altitude of the rotorcraft is within a threshold of the target altitude specified by the altitude profile for the position of the rotorcraft along the ground track.

14. The rotorcraft of claim 12, wherein the FBW system is further operable to control the main rotor system to cause the rotorcraft to autonomously decelerate and to descend by autonomously descending and decelerating the rotorcraft according to the descend plane from the target altitude specified by the altitude profile for the position of the rotorcraft along the ground track after the altitude of the rotorcraft is within the threshold of the target altitude specified by the altitude profile for the position of the rotorcraft along the ground track.

15. A device, comprising:
a processor; and
a non-transitory computer-readable storage medium storing a program to be executed by the processor, the program including instructions to:
receive an initiation of an automated descend-to-hover flight mode;
determine a descend plane according to a rotorcraft location, wherein the descend plane includes an altitude profile that specifies target altitudes along a ground track and further includes a ground speed profile that specifies target ground speeds along the ground track;
receive a command to enter an automated descend-to-hover mode;
determine a relationship between a position of a rotorcraft and the descend plane;
generate, in response receiving the command to enter the automated descend-to-hover mode, and in response to determining that the relationship between the position of the rotorcraft and the descend plane exceeds a predetermined range, control commands for a main rotor system of the rotorcraft that cause the rotorcraft to autonomously intercept the descend plane; and
generate, in response to receiving the command to enter the automated descend-to-hover mode, and in response to determining that the relationship between the position of the rotorcraft and the descend plane is within the predetermined range or after intercepting the descend plane, control commands for the main rotor system of the rotorcraft that cause the rotorcraft to autonomously decelerate and to descend according to the descend plane;
wherein the instructions to generate control commands for the main rotor system of the rotorcraft that cause the rotorcraft to autonomously decelerate and to descend according the descend plane include instructions to:
generate control commands for the main rotor system of the rotorcraft that cause the rotorcraft to autonomously decelerate and to descend according to a first portion of the descend plane until a pilot overrides automated control of the rotorcraft; and
generate control commands for the main rotor system of the rotorcraft that cause the rotorcraft to autonomously decelerate and to descend according to a second portion of the descend plane after the pilot ceases overriding the automated control of the rotorcraft and until a hover is reached.

16. The device of claim 15, wherein the instructions to generate control commands for the main rotor system of the rotorcraft that cause the rotorcraft to autonomously decelerate and to descend according the descend plane include instructions to generate control commands for the main rotor system of the rotorcraft that cause the rotorcraft to autonomously decelerate and to descend according to the descend plane until the rotorcraft reaches a hover.

17. The device of claim 15, wherein the instructions to generate control commands for the main rotor system of the rotorcraft that cause the rotorcraft to autonomously decelerate and to descend according to the second portion of the descend plane after the pilot ceases overriding the automated control include instructions to generate control commands for the main rotor system of the rotorcraft that cause the rotorcraft to autonomously decelerate and to descend according to the second portion of the descend plane after the pilot ceases overriding the automated control of the rotorcraft and until a hover is reached.

18. The device of claim 15, wherein the instructions to generate control commands for the main rotor system of the rotorcraft that cause the rotorcraft to autonomously decelerate and to descend according the descend plane include instructions to generate control commands for the main rotor system of the rotorcraft that automatically adjusts an altitude of the rotorcraft according to the target altitudes of the altitude profile as the rotorcraft advances along a ground track, wherein the target altitudes of the altitude profile decrease at a scheduled descent rate as the rotorcraft advances along the ground track.

19. The device of claim 15, wherein the instructions to generate control commands for the main rotor system of the rotorcraft that cause the rotorcraft to autonomously intercept the descend plane include instructions to generate control commands for the main rotor system of the rotorcraft that cause the rotorcraft to maintain an altitude of the rotorcraft as the rotorcraft advances along the ground track in response to determining that the altitude of the rotorcraft is below a target altitude specified by the altitude profile for the position of the rotorcraft along the ground track and until the altitude of the rotorcraft is within a threshold of the target altitude specified by the altitude profile for the position of the rotorcraft along the ground track.

20. The device of claim 15, wherein the instructions to generate control commands for the main rotor system of the rotorcraft that cause the rotorcraft to autonomously intercept the descend plane include instructions to generate control commands for the main rotor system of the rotorcraft that cause the rotorcraft to reduce, in response to determining that an altitude of the rotorcraft is above a target altitude specified by the altitude profile for the position of the rotorcraft along the ground track, the altitude of the rotorcraft at a rate that exceeds a scheduled descent rate of the descend plane until the altitude of the rotorcraft is within a threshold of the target altitude specified by the altitude profile for the position of the rotorcraft along the ground track.

* * * * *